United States Patent [19]

DeLeo

[11] 4,403,872
[45] Sep. 13, 1983

[54] FLOW DEVICE FOR SENSORS

[75] Inventor: Richard V. DeLeo, Hopkins, Minn.

[73] Assignee: Rosemount Inc., Eden Prairie, Minn.

[21] Appl. No.: 438,792

[22] Filed: Nov. 3, 1982

Related U.S. Application Data

[63] Continuation-in-part of Ser. No. 296,196, Aug. 25, 1981, abandoned, which is a continuation of Ser. No. 91,179, Nov. 5, 1979, abandoned.

[51] Int. Cl.³ ............................................. G01K 3/02
[52] U.S. Cl. ................................................... 374/138
[58] Field of Search ...................... 374/138; 73/861.68

[56] References Cited

U.S. PATENT DOCUMENTS

| | | | |
|---|---|---|---|
| 2,588,840 | 3/1952 | Howland | 73/349 |
| 2,931,227 | 4/1960 | Werner et al. | 73/349 |
| 2,970,475 | 2/1961 | Werner | 73/339 |
| 3,170,328 | 2/1965 | Werner et al. | 73/349 |
| 3,512,414 | 5/1970 | Rees | 73/349 |
| 4,152,938 | 5/1979 | Danninger | 73/349 |

*Primary Examiner*—S. Clement Swisher
*Attorney, Agent, or Firm*—Kinney, Lange, Braddock, Westman and Fairbairn

[57] ABSTRACT

A device for measuring a parameter such as temperature, humidity, or the like in a fluid stream having a leading portion and a trailing portion forming an elongated longitudinal housing with a bore extending longitudinally through the portions for flow therethrough. The flow rate is internally regulated to a desired rate by a restriction in the bore located in the trailing portion. Where the fluid stream is air, the restriction provides for internal Mach number regulation at various flow rates. A first plurality of ports is located in the leading portion for boundary layer control. The device has one or more annular fluid passageways downstream of the first ports coupled to the bore and ported to the exterior to cooperate with the bore to provide a lower pressure area for flow therethrough, and a sensor disposed in at least one such passageway. The leading portion may incorporate anti-icing for air stream measurement. For temperature sensors, radiation shielding is provided.

17 Claims, 6 Drawing Figures

FLOW DEVICE FOR SENSORS

CROSS REFERENCE TO RELATED APPLICATIONS

This application is a continuation-in-part of my copending U.S. patent application Ser. No. 296,196 filed Aug. 25, 1981, now abandoned which in turn was a continuation of my U.S. patent application Ser. No. 91,179, filed Nov. 5, 1979, now abandoned, and both entitled "Flow Device for Sensors."

BACKGROUND OF THE INVENTION

1. Field of the Invention

The invention relates to measurement of flow parameters and provides a desired flow to impinge on the sensing element at various stream flow rates.

2. Description of the Prior Art

Devices for sensing data in a flow stream which provide for accurate, fast response and ruggedness at relatively low cost are desirable. While certain devices may have been useful in the past, the advantages of the present device, as disclosed herein, are apparent.

In the prior art, U.S. Pat. No. 2,970,475 issued Feb. 7, 1961 and has the same assignee as the present invention. That patent provided for boundary layer control (BLC) for a gas temperature probe, thus increasing the capability of a temperature sensor to accurately read the total temperature of the fluid when brought to rest against the sensing element. In U.S. Pat. No. 3,512,414, also held by the same assignee as the present invention, further advantages of ruggedness, minimum drag, BLC and others are shown. The utility of inventions for such applications has been established by use for laboratory testing, and by extensive commercialization for air vehicles.

Recently, U.S. Pat. No. 4,152,938 issued. While this patent may appear to be somewhat similar to the present invention, it is stated at column 5, line 61, "Because the probe requires unobstructed flow through bore 14 the preferred structure . . . ". As herein disclosed, regulation of internal flow enhances operation, for example, where the fluid is air, regulation of flow enhances operation at Mach numbers above 0.5. No means, method or the desirability of such means or method for regulation is disclosed in U.S. Pat. No. 4,152,938. Other advantages are apparent from the invention as herein disclosed.

SUMMARY OF THE INVENTION

A device for measuring a parameter in a fluid stream, which, in one preferred embodiment, is temperature in an air stream, is disclosed. The device has a leading portion and a trailing portion thus forming an elongated longitudinal housing with a bore substantially centered on its longitudinal axis for flow of the fluid stream therethrough. A restriction or throat is disposed in the bore at the trailing portion to control the rate of flow through the device. When the fluid stream is air, Mach number regulation in the bore is thus provided. Regulation of the rate of flow internal to the device enhances operation at higher ambient flow rates. For example, for operation in air at higher subsonic Mach numbers, e.g., above Mach 0.5, poor overall performance such as poor accuracy and repeatability, is avoided. Selection of a restriction or throat size based on the bore diameter to regulate the internal rate of flow as for air to a Mach number below 0.5 has resulted in enhanced performance. Further, the restriction or throat raises the internal pressure so that routing of a portion of undisturbed fluid to the sensor, which is disposed in an annular passageway outboard of the bore, is more easily accomplished. Because of porting of fluid from the bore for boundary layer control, the sensing element, disposed in the passageway, is subjected to relatively undisturbed, free stream fluid parameters such as temperature which, for example, is raised substantially adiabatically upon impingement on the sensing element. Radiation shielding for the sensor is provided. A further advantage is that since the internal pressure is raised due to the restriction or throat, it is not required that the external shape of the housing increase in diameter rearwardly as required in U.S. Pat. No. 4,152,938. The internal pressure is raised considerably above the local static pressure and, hence, the flow is more easily induced into the passageway and to the sensor. Similarly, the raised internal pressure compared to the local static pressure enables porting of the first passageway to the exterior of the device from the area of constant diameter, at the device strut or in an aft facing direction as desired.

It is understood herein that the fluid stream may be moving with relation to the device, which is in a fixed location such as a gas conduit, wind tunnel or the like, or the device may be mounted to an air vehicle, such as aircraft, missile, helicopter, or the like and such air vehicle may be moving through the fluid or air mass. The terms "Mach" and "total temperature", "flow", "pressure" and others used herein have the same meanings as in the aeronautical sciences.

DETAILED DESCRIPTION OF THE PREFERRED EMBODIMENTS

Figure 1:
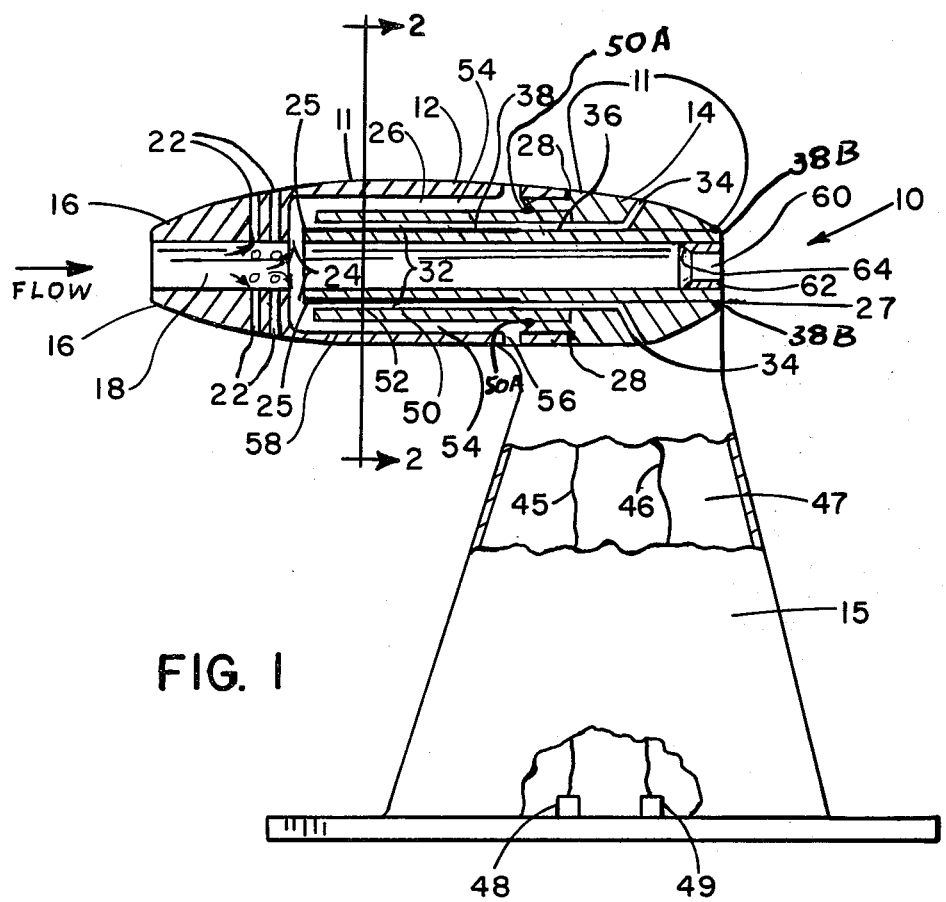
FIG. 1 is a sectional view of a first preferred embodiment of the housing taken as on line 1—1 in FIG. 2 with a fragmentary view of the strut for mounting the device.
Figure 2:
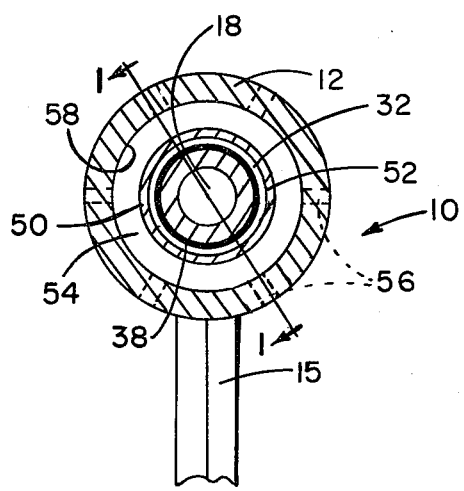
FIG. 2 is a sectional view of the housing taken as on line 2—2 in FIG. 1.

A first preferred embodiment of a device for measuring a parameter in a fluid stream is shown in FIG. 1 and FIG. 2 and is generally indicated at 10. Device 10 includes a housing 11 which is formed of two main housing elements connected together, a leading portion 12 and a trailing portion 14 which form the elongated longitudinal shape of device 10. A strut 15 connected to trailing portion 14 supports device 10 in a desired position relative to a flow stream.

Leading portion 12 preferably is cast or formed from a cylindrical block of metal. A flow face 16 preferably is contoured convex to provide a relatively sleek aerodynamic shape and to reduce drag. A central, relatively uniform bore 18 is made substantially along the axis of the elongated longitudinal housing which housing is formed by leading portion 12 and trailing portion 14 for flow therethrough. Leading portion 12 has an inlet port for flow, which flow is indicated as left to right by the arrow in FIG. 1. Trailing portion 14 through bore 18 is the main outlet for flow.

At the point on flow face 16 where the leading portion approaches its maximum exterior diameter a first series of ports 22, which preferably are two rows of six ports each spaced around leading portion 12, are provided and the ports extend through the wall of leading portion 12 to bore 18. These ports 22 cooperate with bore 18 to exhaust flow from bore 18 to the exterior, thus providing boundary layer control (BLC) in bore 18. This concept is fully explained in U.S. Pat. No. 2,970,475.

Trailing portion 14 is also cast or formed from a metal block. Trailing portion 14 has a first end 25 and an outlet end 27. The first end 25 of trailing portion 14 is suitably dimensioned to be inserted into a large bore 26 in leading portion 12 thus forming an annular passageway open to bore 18 through an annular inlet 24. Leading portion 12 and trailing portion 14 preferably are connected together in a conventional manner as by welding, brazing or the like where surfaces of the two overlap as at 28. Ports 22 are spaced closely upstream from annular inlet 24 and the flow through ports 22 urges the lighter particles of the flow, for example, the molecules forming air, to change direction more than the heavier particles such as the suspended solids, raindroplets or the like. Similarly, the lighter particles tend to flow into the annular inlet 24 from bore 18.

A first annular passageway 32 is formed by casting or machining in trailing portion 14 radially outboard of bore 18. Passageway 32 has a plurality of ports 34, preferably six, which preferably are angled from the longitudinal or the flow axis. Ports 34 are located near the maximum exterior diameter of trailing portion 14, but may exhaust parallel to the longitudinal or flow axis. Passageway 32 then cooperates with bore 18, inlet 24 and ports 34 as well as ports 22 to provide a relatively undisturbed flow of fluid through passageway 32.

Figure 3:
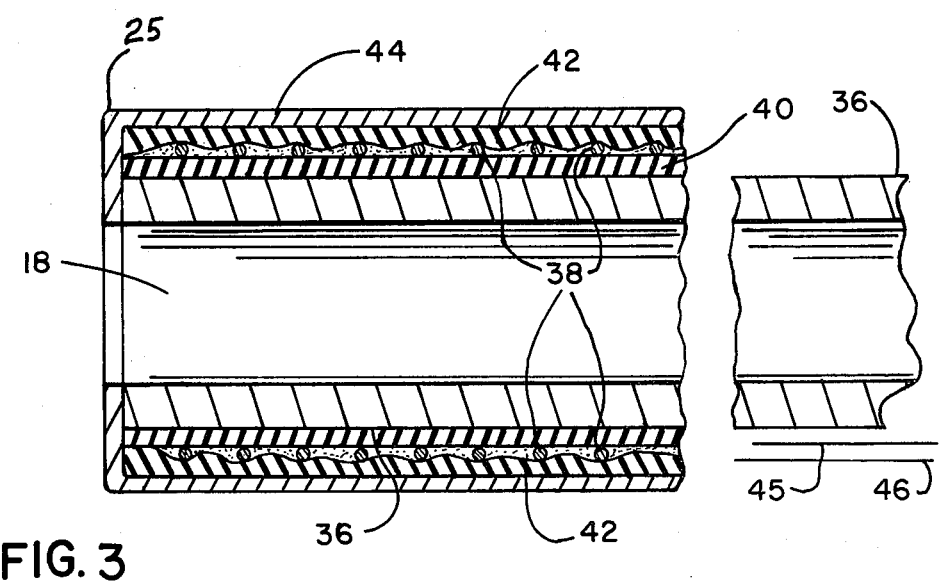
FIG. 3 is a fragmentary sectional view of a temperature sensing element for the device of the present invention.

An inner surface 36 of passageway 32 preferably has a sensor or element 38 disposed thereon. One example of a sensor is shown in FIG. 3. An insulator layer 40 such as mica is first disposed on surface 36. An element 38, which preferably is a platinum wire resistor is then wrapped over insulator 40 and a second layer of an insulator 42 is then disposed on element 38. For further protection for element 38 an outer tube 44 preferably is slid or drawn over the entire element 38. Tube 44 may then be mechanically or hydrostatically swagged onto element 38 to further improve ruggedness and response time. Conventional treatment to hermetically seal element 38 preferably is also provided. Suitable leadwires 45 and 46 are then conventionally connected to ends of sensor 38 respectively in a flow direction longitudinally aft of sensor 38 in trailing portion 14. As best shown in FIG. 1, leadwires 45 and 46 are then routed through a central cavity 47 in strut 15 to a desired interface connection 48 and 49 respectively. Other sensors such as pyrometers, thermocouples, humidity sensors, pressure sensors or the like and known mounting methods for such sensors may be used. Sensor 38 is mounted in position before housing portion 12 and 14 are joined together.

The ruggedness of a resistance wire wound over a sleeve is time tested and proven in years of applications in other temperature sensing applications. Sensing element 38 embodies this construction, which provides a substantially greater expected life than bare wire sensors. Response time and ruggedness of sensor 38 is improved by swaging tube 44.

An annular (tubular) separator 50 is preferably formed in trailing portion 14. Separator 50 provides an outboard barrier 52 for first passageway 32 and radiation shielding for sensor 38. Separator 50 in cooperation with the large bore 26 of leading portion 12 also forms a second annular passageway 54 in device 10. Second passageway 54 exhausts to the exterior through a plurality of ports 56, preferably six. Ports 56 preferably are located somewhat aft of the longitudinal midpoint of device 10. Passageway 54 in cooperation with the fluid stream in bore 18, inlet 24, and ports 56 provides a third path for the fluid stream flow. Passageway 54 further urges the flow into inlet 24 and provides further BLC so that the flow reaching sensor 38 is relatively undisturbed having substantially free stream flow characteristics. Exterior wall 58 surrounding large bore 26 provides a second radiation shield for sensing element 38. To permit ease for mounting sensor 38 on inner surface 36, trailing portion 14 preferably is an assembly comprised of separator 50 which has a cylindrical shape and is brazed to trailing portion 14 at 50A, then the tube 38A which has sensor 38 mounted on its inner surface 36 preferably is brazed to trailing portion 14 at 38B.

A restriction or sonic throat 60 is formed at outlet end 27 of trailing portion 14 by welding or brazing a suitable metal insert 62 to the inner wall of bore 18, thus reducing the effective inside diameter of bore 18 at outlet end 27. Insert 62 on its flow facing side preferably is formed to have a taper 64 from bore 18 to the reduced diameter of restriction 60 to reduce turbulence in the flow caused by restriction 60. In one preferred embodiment for air flow, the diameter of bore 18 was 6 millimeters and the minimum throat 60 diameter was 5 millimeters and the maximum diameter of the device 18 millimeters, thus regulating the rate of flow of air for higher subsonic Mach numbers of air flow to Mach 0.35 in bore 18 of device 10. It is understood that other bore and throat diameters for regulation to other selected flow rates for other fluids or other Mach numbers for air are determined using conventional calculation methods. The restriction 60 is of size to regulate the internal flow rate of air in the bore 18 to in the range of 0.1 to 0.5 Mach.

In operation, restriction or throat 60 regulates rate of flow through device 10 and raises the internal pressure in bore 18 to further urge flow through both ports 22 and inlet 24, and through passageways 32 and 54. This increased internal pressure urging the flow through such ports and passageway enhances conditions so that fluid reaching sensor 38 has parameters substantially similar to the fluid stream in an undisturbed and uncontaminated state.

The construction of this embodiment both takes advantage of the prior art teachings by routing heavier particles in the fluid through bore 18, but also diverts only relatively undisturbed free stream fluid to the sensor 38. Restriction or throat 60 enhances the capability of device 10 to divert the fluid with minimal disturbance or turbulence added thereto.

Figure 4:
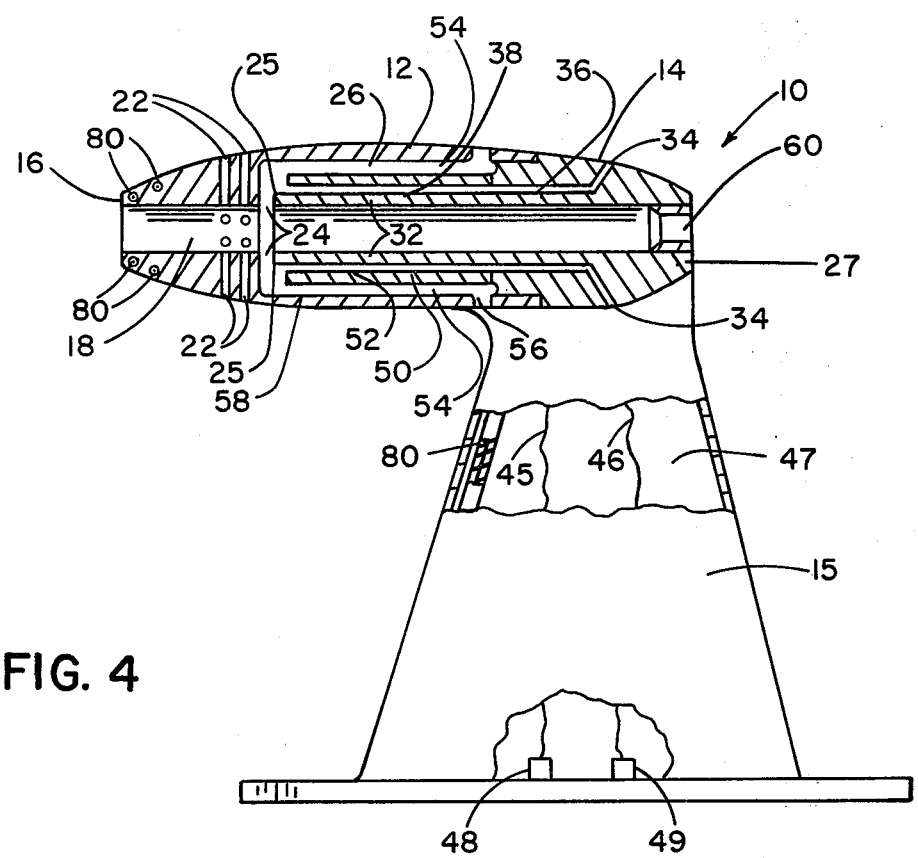
FIG. 4 is a fragmentary sectional view of another preferred embodiment of the housing having electrical anti-icing taken on the same line as FIG. 1 and a fragmentary view of the housing.

In FIG. 4 another preferred embodiment is shown. There, flow face 16 of leading portion 12 is shown with electrical heating element 80 for anti-icing. Cavity 47 in strut 15 is shown with leadwires 45 and 46 and a heating element 80 therein. In one embodiment heating element 80 is comprised of two conductors with a resistance therebetween. The conductors are at different potentials and, hence a current flows through the resistor thus generating heat for anti-icing. Other conventional heating elements such as coils, resistors and the like may be used. As shown, heating element 80 preferably is conventionally disposed in flow face 16 in leading portion 12. Heating element 80 also is shown in cavity 47 near the leading edge of strut 15 to provide anti-icing on such leading edge, and may also be disposed in outlet end 27 or other areas of device 10 for anti-icing as desired.

Figure 5:
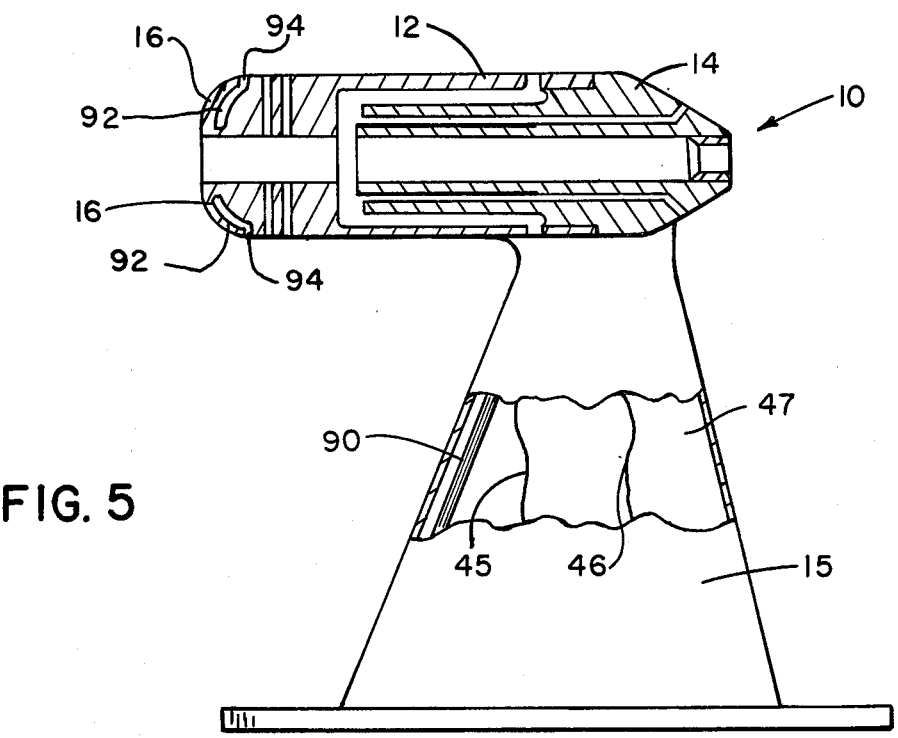
FIG. 5 is a sectional view of a second preferred embodiment of the housing taken as on the same line as FIG. 1 and a fragmentary view of the strut.

In FIG. 5 another preferred embodiment is shown. There, flow face 16 of leading portion 12 is shown as somewhat more blunt than as shown in FIG. 1. In this embodiment, cavity 47 in strut 15 is shown with leadwires 45 and 46 and a conduit 90 for carrying hot gas, such as, engine bleed air from a jet engine compressor of an air vehicle, or rocket exhaust gas or the like, which conduit is provided to conduct heat to flow face 16 for anti-icing. Conduit 90 preferably is routed on the leading edge of strut 15 to provide anti-icing on the surface also. Conduit 90 is coupled to an annular cavity 92 in leading portion 12 which provides the hot gas to heat flow face 16. The hot gas is then exhausted through a suitable configuration of hot gas ports 94. If desired, such hot gas may also be routed to outlet end 27 or other areas of housing 11.

Figure 6:
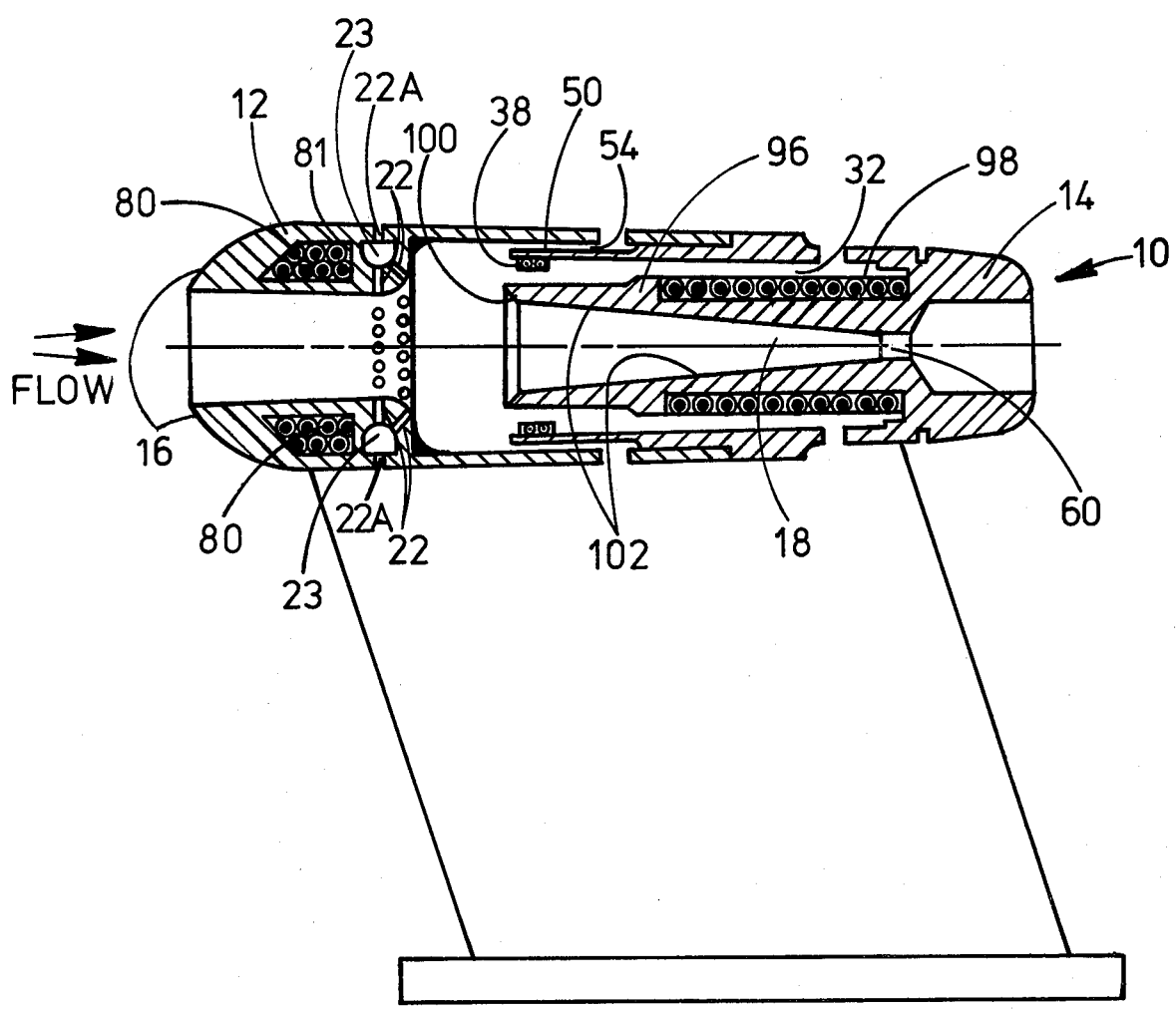
FIG. 6 is a sectional view of a further embodiment of the present invention taken on substantially the same line as FIG. 1.

It has been demonstrated that the preferred embodiments previously discussed have satisfactorily performed in icing conditions that define the practical requirements for successful commercial aircraft operation, i.e., a flow stream liquid water content of 0.5 gram per cubic meter. For certain applications, it is desirable that the device remain free from ice buildup more severe icing conditions. FIG. 6 shows a preferred embodiment that provides the further enhanced anti-ice characteristics. Difference from the other preferred embodiments detailed consist of bore 18, defined by receiver wall 102 tapering from leading edge 100 of receiver 96 to throat 60, the addition of the receiver heater 98 and the attachment of the sensor 38 to separator 50.

It has been found that under severe icing conditions, ice buildup may occur where the flow stream encounters an angular change in bore 18. In the embodiment in FIG. 6, the gradual taper of the bore has the effect of providing a smoother transition to throat 60, so that angular changes in receiver wall 102 that are presented to the flow stream in which ice may build up are further minimized.

Flow as shown by the arrow in FIG. 1 is parallel with the longitudinal axis of bore 18. Such flow is said to be at zero degrees angle of attack with respect to device 10. The arrows in FIG. 6 show two different flow conditions where the flow stream is not parallel to bore 18. There is an angular difference between the direction of flow and an extension of the longitudinal axis of bore 18. This is commonly referred to as a positive or negative angle of attack equal to the angular difference. Since aircraft fly at varying angles of attack, device 10 must perform accurately at varying angles of attack. As can be seen, water droplets in the flow stream may be more likely to strike leading edge 100 of receiver 96 when device 10 is operating at an angle of attack other than zero. Leading edge 100 of receiver 96 provides a place for the accumulation of ice when in icing conditions. Accordingly, it is required that receiver heater 98 be of sufficient power and in close enough proximity to leading edge 100 of receiver 96 for sufficient heat to conduct through receiver 96 to anti-ice and de-ice leading edge 100, as well as to anti-ice and de-ice the remainder of receiver 96. In a preferred embodiment, receiver heater 98 is constructed of nickel alloy heating wire, wound around and imbedded in receiver 96 and dissipating between 50 and 80 watts of power. It is located between 1.0 and 2.0 cm from leading edge 100 of receiver 96. Correct wattage and positioning of receiver heater 98 are determined through wind tunnel tests. It is understood that other heaters that supply adequate heating throughout receiver 96 may be used.

It may be desirable that sensor 38 be unaffected by the heat generated by receiver heater 98. Where this is a consideration, the performance of sensor 38 may be further enhanced by attaching it to separator 50 as shown in FIG. 6, spaced apart from receiver 96.

In the preferred embodiment shown in FIG. 6, restriction or throat 60 is reduced more than in other preferred embodiments to further urge the flowstream into passageways 32 and 54. The practical requirements for throat 60 are that it be of area no larger than is required to ensure that water droplets will pass through to exit bore 18. In the preferred embodiment shown the ratio of the area of throat 60 to that of receiver leading edge 100 is such that when the flow is sonic in throat 60, it is 0.025 to 0.1 Mach at leading edge 100 of receiver 96. It has been determined that a preferred size of throat 60 is defined by a diameter of between 0.20 and 0.41 cm where the diameter of receiver 96 is 1.0 cm at leading edge 100. In a preferred embodiment, the ratio of the diameter of receiver 96 at leading edge 100 to the diameter of throat 60 is 3.5:1.

Additional changes in FIG. 6 from the embodiment shown in FIG. 4 are incorporated primarily to facilitate construction and assembly of device 10. The two rows of ports 22 are connected to plenum chamber 23. A single row of ports 22A is connected to plenum chamber 23 and conveys the boundary layer air exhausted from bore 18 by ports 22 to the exterior. Electrical heating element 80 is bunched in single cavity 81 in leading portion 12. This permits the inclusion of more windings of element 80 than shown in FIG. 4. Heat from element 80 is conducted forward through leading portion 12 to heat flow face 16.

What is claimed is:
1. A device for measuring a parameter in a fluid stream comprising a housing having an exterior and having:
an elongated longitudinal exterior shape and a bore defined in the housing along the shape for flow of the fluid stream therethrough;
a leading portion at a first end of the bore;
a trailing portion at a second end of the bore;
the exterior shape being contoured convex at the leading portion;
restriction means in the bore for internal flow regulation;
first plurality of port means from the bore to the exterior of the housing in the leading portion for providing boundary layer control;
first annular fluid passageway means in the housing downstream of the first port means outboard of the bore and coupled to the bore upstream of the restriction means and ported to the exterior to cooperate with the bore to provide a lower pressure area for the fluid which flows into the first passageway means; and sensor means to measure the parameter supported in the first passageway means between the coupling to the bore and the porting to the exterior.

2. Apparatus according to claim 1 further comprising a second annular passageway means formed in the housing outwardly of the first passageway means coupled to the bore and to the first passageway means and ported to the exterior to enhance flow to the sensor, which flow has parameters substantially similar to the fluid stream in an undisturbed state.

3. Apparatus according to claim 2 wherein the restriction is of size to regulate internal flow rate to less than Mach 0.5.

4. Apparatus according to claim 2 wherein the restriction is of size to regulate internal flow rate to Mach 0.35.

5. Apparatus according to claim 2 wherein the leading portion of the housing has a blunt nose.

6. Apparatus according to claim 2 wherein the leading portion further comprises heating means for anti-icing.

7. Apparatus according to claim 2 wherein the wall forming the second passageway means is selected from a material to provide radiation shielding for the sensor means.

8. Apparatus according to claim 2 wherein a portion of the bore and restriction means are defined by a receiver wall extending from the restriction means upstream to the coupling of the first annular fluid passageway means, the receiver wall thermally coupled to receiver heater means, the receiver heater means for providing anti-icing the full extent of the receiver wall.

9. Apparatus according to claim 8 having the receiver wall constructed of a thermally conductive material, the thermal conductivity of the receiver wall acting in cooperation with the receiver heater means to conduct sufficient heat to provide the anti-ice function the full extent of the receiver wall.

10. Apparatus according to claim 2 wherein the receiver wall defines a bore that gradually tapers down in size, providing a smooth transition to the restriction means.

11. Apparatus according to claim 2 wherein the restriction means is of size to regulate internal flow Mach number in the bore between 0.025 to 0.1 where the bore is defined by the upstream portion of the receiver wall when flow in the restriction means is sonic.

12. An air data sensing device comprising:
inlet means to provide for air flow to enter the device;
outlet means coupled to the inlet means to provide for air flow to exhaust from the device;
central passageway means in the inlet means and the outlet means for air flow therethrough;
the outlet means further having means defining a flow restriction in the central passageway means to regulate the Mach number of the flow therethrough;
first port means in the device open to the central passageway means and oriented to radially exhaust flow from the central passageway for Boundary Layer Control;
first annular fluid flow passageway means in the device connected to the central passageway means downstream of the first port means, and exhausting fluid from the device for providing air flow having substantially free stream air characteristics;
second annular fluid passageway means in said device outwardly of and fluidly coupled to the first annular passageway means and to the central passageway means and exhausting fluid from the device to further enhance Boundary Layer Control;
sensor means annularly disposed in the first annular passageway means to measure the parameter.

13. Apparatus according to claim 12 wherein the inlet means further comprises a relatively blunt nose on the flow face of this inlet means.

14. Apparatus according to claim 12 wherein the inlet means further comprises heater means for anti-icing.

15. Apparatus according to claim 12 wherein the restriction means regulates the Mach number.

16. Apparatus according to claim 12 wherein the restriction means regulates the Mach number to between 0.1 and 0.5 Mach.

17. Apparatus according to claim 12 wherein the restriction means regulates the Mach number to 0.35 Mach.

* * * * *

UNITED STATES PATENT AND TRADEMARK OFFICE
CERTIFICATE OF CORRECTION

PATENT NO. : 4,403,872

DATED : September 13, 1983

INVENTOR(S) : Richard V. DeLeo

It is certified that error appears in the above-identified patent and that said Letters Patent is hereby corrected as shown below:

Column 6, line 61, (Claim 1, line 13), before "first" insert --a--. Column 8, line 28, (Claim 12, line 23), after "Control", insert --and--.

Signed and Sealed this

Twentieth Day of December 1983

[SEAL]

Attest:

GERALD J. MOSSINGHOFF

Attesting Officer      Commissioner of Patents and Trademarks